March 11, 1958 M. L. KUDER ET AL 2,826,079
AUTOMATIC COIN WEIGHING MACHINE
Filed Oct. 22, 1954 2 Sheets-Sheet 1

INVENTOR
Milton L. Kuder
Ervin C. Palasky
Saul R. Gilford
Maurice L. Greenough
BY Arthur Vinograd
ATTORNEY March 11, 1958  M. L. KUDER ET AL  2,826,079
AUTOMATIC COIN WEIGHING MACHINE
Filed Oct. 22, 1954  2 Sheets-Sheet 2

INVENTORS
Milton L. Kuder
Ervin C. Palasky
Saul R. Gilford
Maurice L. Greenough

BY
Arthur Vinograd
ATTORNEY

United States Patent Office 2,826,079
Patented Mar. 11, 1958

2,826,079
AUTOMATIC COIN WEIGHING MACHINE

Milton L. Kuder, Washington, D. C., Ervin C. Palasky, Hyattsville, and Maurice L. Greenough, Silver Spring, Md., and Saul R. Gilford, Oberlin, Ohio, assignors to the United States of America as represented by the Secretary of Commerce Application October 22, 1954, Serial No. 464,194

7 Claims. (Cl. 73—432)

This invention relates to a machine for weighing circular objects, and more particularly to an automatic mechanical coin-weighing machine especially designed for use in the minting of coins.

The weighing system now used by the U. S. Department of the Treasury for weighing coins consists in dropping a coin into a basket suspended from the beam of an analytical balance and allowing the beam to come to rest. The beam is then clamped into a stationary position and the coin is ejected into either a high or a low chute representing an underweight or overweight coin with respect to the standard coin against which it is measured. This process takes about four seconds. A limitation on increasing the response speed of this type of balance is the ratio between the mass of the beam and the comparatively small difference in weight between the two coins, since the small difference in mass of the coins will not accelerate the large mass of the beam very rapidly.

The present invention comprises a fully automatic machine for weighing coins very rapidly. The machine of the present invention can weigh and sort 18,000 coins per hour with an accuracy of one-fourth of one percent in the weighing of quarters and with even greater accuracy in the weighing of larger coins. The new system has the advantages of high sensitivity, low susceptibility to seismic noise, and independence from the physical properties of the coins except for coin diameter which is held to very close tolerances in manufacture.

One object of this invention is to provide improved means for automatically weighing and sorting circular objects.

Another object of this invention is to provide improved means for automatically weighing and sorting coins.

Another object of this invention is to provide means for automatically weighing coins at a high rate of speed.

A further object is to provide means for weighing coins with a high degree of accuracy.

A final object of this invention is to provide means for weighing coins independent of all the physical properties of the coins except the coin diameters.

The system is more fully explained with reference to the accompanying drawings in which.

The coin weighing machine according to the present invention weighs coins by measuring the degree of unbalance imparted to a rapidly revolving flywheel into which two coins, i. e. the standard and the one to be weighed, have been placed. If initially the flywheel was precisely balanced, the difference in weight between the two coins will displace the center of mass slightly from the geometric center of the wheel. Detection of this displacement provides the basis for measuring the weight of the coin. A unique method is included in the machine for injecting the coin into the rapidly moving flywheel and removing the coin after it has been weighed. Sorting of coins into "good" and "bad" categories is accomplished through suitable circuitry and structure which permits precise determination of the angular position of the wheel at which the coin is to be removed so that it will fall in the proper container.

Figure 1:
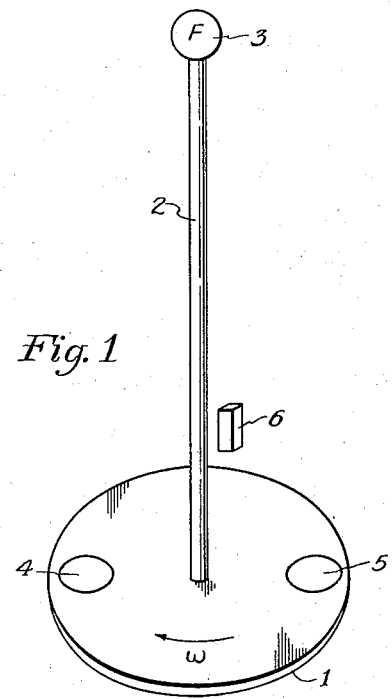
Fig. 1 shows a diagram of the fundamental physical elements of the weighing system.

In Fig. 1 as shown, the system is essentially a pendulum, the principal mass of which is concentrated in a balanced flywheel henceforth referred to as coin wheel 1 which is preferably approximately seven inches in diameter. The coin wheel 1 is mounted on the lower end of a vertical rotating rigid shaft 2. At the top of the shaft 2 is a double gimbal mount 3 which acts as a fulcrum for the shaft 2 leaving it free to swing in any direction. Above the gimbal mount 3 and not shown is a D. C. motor which turns the coin wheel 1 at an angular velocity $\omega$ of 3000 R. P. M. The shaft 2 is of such length that the natural pendulum period of the shaft and wheel is much longer than the period of vibration established by the rotational motion of wheel 1. Thus the vibrational effects due to the wheel 1 are effectively independent of the pendulum action of the wheel and shaft, and the rotation of the center of mass of the wheel 1 about its geometric center takes place as though the wheel were a body revolving in free space.

Elements 4 and 5 represent the standard coin and the coin of unknown weight disposed diametrically opposite from each other along an imaginary diameter line of the coin wheel 1 and at equal distances from the center of the wheel. A mutual inductance micrometer is shown at 6 which serves to sense the magnitude of the lateral displacement of shaft 2 due to the rotation of coins of unequal weight.

Figure 2:
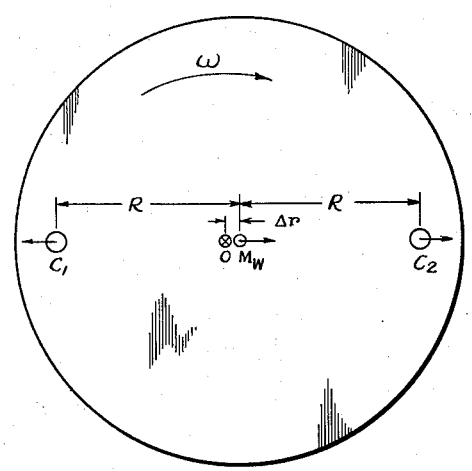
Fig. 2 shows a dynamic force diagram of the weighing system.

A better understanding of the principle involved can be had from Fig. 2 which shows a force diagram of the coin wheel 1 in an instantaneous steady state rotational position assuming the mass $C_1$ of coin 4 to be greater than the mass $C_2$ of coin 5.

Equating the forces on each side of the center of rotation:

(1) $\quad C_1(R-\Delta r)\omega^2 = M_\omega \Delta r \omega^2 + C_2(R+\Delta r)\omega^2$ which is rearranged and simplified to (2) $\quad M_\omega \Delta r = C_1(R-\Delta r) - C_2(R+\Delta r)$ Since $\Delta r \ll R$, this simplifies to:

(3) $\quad M_\omega \Delta r \cong (C_1 - C_2)R$

This may be written as (4) $\quad \Delta r = \dfrac{R}{M_\omega}(C_1 - C_2)$

Since $M_\omega$ and R are constant:

(5) $\quad \Delta r \propto (C_1 - C_2)$

Where $O$ = center of rotation
$M_\omega$ = mass of wheel alone concentrated at its geometric center
$\omega$ = angular speed of rotation
$C_1$ and $C_2$ are coin blank masses
$R$ = distance of the coin blanks from the geometric center of the wheel, and
$\Delta r$ = shift of center of mass of the wheel from its geometric center caused by addition of unequal wt. coins 4 and 5.

It can be seen from the equations that the distance the center of mass of the wheel shifts is directly proportional to the difference between two weights, one of which is the known weight of a standard coin. Obviously if $C_1$ were assumed to be less than $C_2$ rather than greater, the center of mass shift would be in the opposite direction and the distance $\Delta r$ would have the opposite sign.

By rotating the wheel 1 at 3000 R. P. M. with the coins 4 and 5 about two and one-half inches from the center of the wheel, an acceleration of nearly 500 g. is imparted to the coins. This magnifies the small weight differential between the coins 500-fold. The vector product of the large synthetic acceleration and the small differential mass is the force which causes the wheel to accelerate rapidly into a new orbit about its new center of mass whenever a coin of unknown weight is placed in the wheel.

Within six wheel revolutions after a new coin is placed on the wheel the initial transient disturbance resulting from loading the new coin into the periphery of the wheel while it is rotating is damped down. Since the wheel is revolving at 3000 R. P. M., these six revolutions take only 0.12 second. The subsequent detection of the constant amplitude of vibration that determines the difference in weight between the two coins is made during the two following revolutions. A total of ten revolutions is allowed for the complete weighing cycle; thus five coins can be weighed each second.

Figure 3:
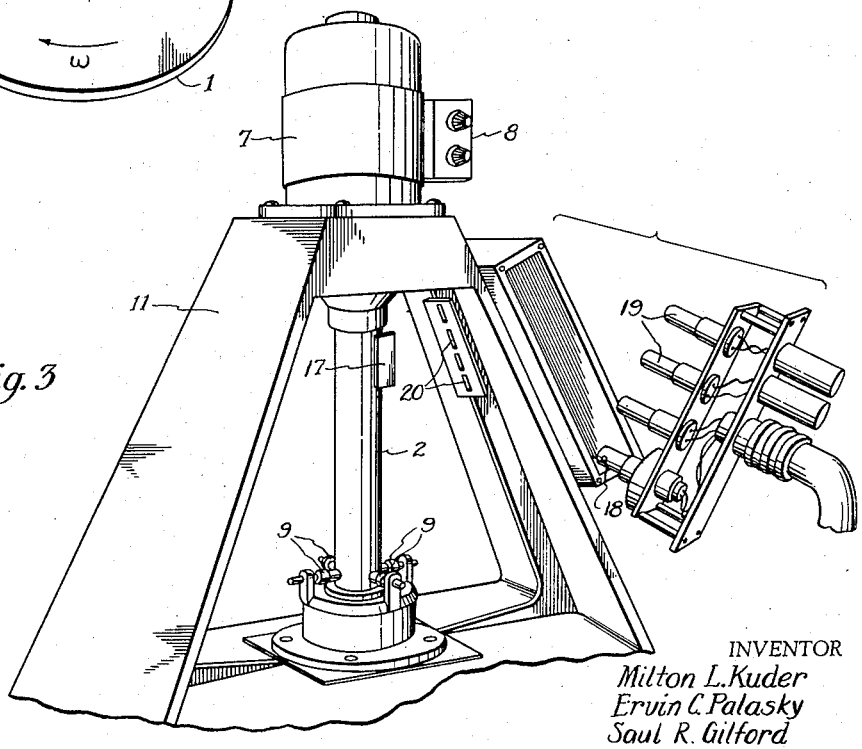
Fig. 3 shows the overall physical embodiment of the A-frame associated with the coin weighing machine.

Fig. 3 shows the physical construction of the wheel supporting structure and associated elements. At 7 appears the D. C. drive motor for imparting rotary motion to shaft 2. The motor fuse box is shown at 8. The means for providing the damping referred to above takes the form of two sets of damping bumpers 9 adjacent the lower portion of shaft 2. As can be seen the entire unit is supported by a metallic A-frame indicated generally at 11.

Figure 4:
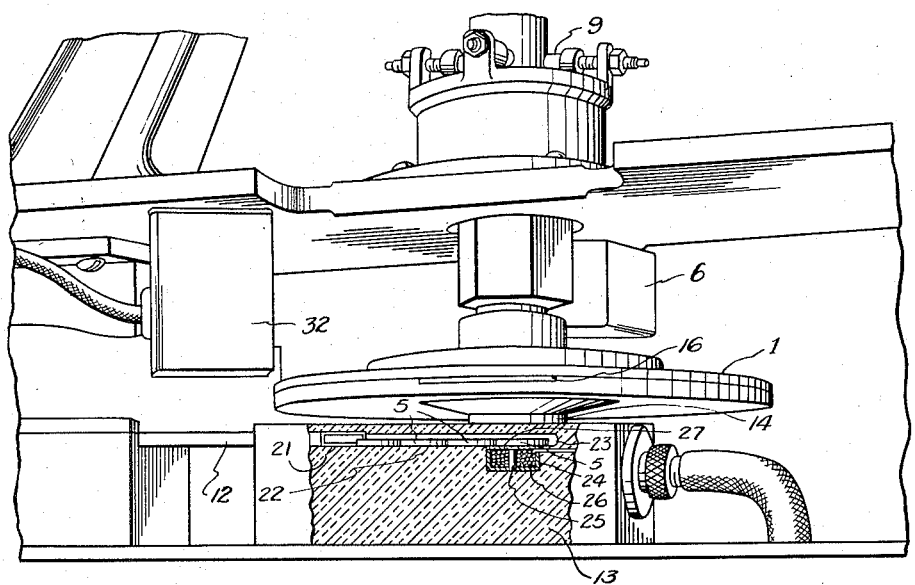
Fig. 4 shows the lower portion of the A-frame assembly.

Fig. 4 illustrates the lower portion of the A-frame support showing the relation of the coin wheel 1 to the A-frame mechanism and associated elements.

An electronic mutual-inductance micrometer 6, Figs. 1 and 4, of the type described in an article in Electronics entitled, "Technical Data on Electronic Micrometers," vol. 20, pages 172–180, November 1947, placed near the wheel hub detects the lateral oscillations of the pendulum shaft. This device is an extremely sensitive transducer which can determine a change in length as small as 50 microinches and can accurately measure the few thousandths of an inch displacement in the weight-indicating vibration. The transducer consists of two coplanar, coaxial coils wound on a dielectric core. The primary coil is energized from a regulated R.-F. source whose frequency is much higher than the wheel vibration frequency. The mutual-inductive coupling between the primary and secondary varies as a nearby conducting material—i. e. the wheel hub—moves toward or away from the coil assembly. When the wheel vibrates, the secondary coil generates a modulated A.-C. signal whose period is equal to one revolution of the wheel. In the present weighing machine the transducer with its regulated power supply and simple amplifier produces a signal of relatively large amplitude which is linearly proportional to the departure of the coin from the nominal weight. The response speed is more than adequate to meet the requirements of this use.

Referring again to Fig. 4 entrance chute 12 is provided for the passage of the coins 5 to be weighed. The coins are arranged edge to edge along the chute as shown and are successively moved along by a reciprocating hydraulic ram with a stroke length equal to the diameter of one coin. The hydraulic ram driving means is not illustrated and forms no part of the present invention.

A solid dielectric block 13 is slotted to receive the end of chute 12. Chute 12 extends into block 13 to point 21 where it ends. The coins then pass along a passage 22 in block 13 and the rightmost coin abuts against semicircular end 23 of passage 22. The end 23 of passage 22 is of semicircular shape to avoid excessive bouncing of the coins as they are forced against the end of the passage. Chute 12 and passage 22 provide room for eleven coins placed edge to edge in the embodiment shown. As each successive coin is inserted into the wheel 1 an additional coin is placed in the entrance of chute 12 by any suitable automatic feeding means (not shown).

At 24 is shown a cup-shaped ferrite core completely enclosing a plurality of solenoid windings 26 of suitably sized wire, for example, number 26 enameled wire. Core 24 includes central post 25 around which windings 26 are wound.

The entire solenoid assembly 24, 25, 26 is coated over its upper surface with a thin coating 27 of dielectric coating which may be of the same material as block 13. It should be noted that the only metallic objects near core 24 are the coins 5 traveling along passage 22 so that the magnetic field produced by solenoid 26 utilized to insert each coin is not weakened by the presence of any nearby metal.

In operation the coin to be weighed passes along chute 12 into the dielectric block 13. Here solenoid 26 injects the coin into the wheel 1 through a coin entrance hub 14. The coin is weighed and then passes out exit port 16.

The coin to be weighed and the standard coin lie on a straight line which passes through the geometrical center of the wheel 1. If the coin to be weighed is heavier or lighter than the standard, the center of mass of the pendulum moves along this straight line to one side or other of the geometric center of the wheel. Depending upon whether the coin is lighter or heavier than the standard, the wheel can vibrate in either of two modes which are 180° apart with respect to the time at which the coin in the wheel passes a given point. As can be seen in Fig. 3, three mirrors 17, shown in the drawings as a single mirror, mounted on the rotating shaft 2 at slightly different angles with respect to the shaft axis reflect beams of light from light source 18 onto three photocells 19, thereby generating an electrical pulse each time the coin passes a given point corresponding to the position of each mirror on the shaft. This direct and reflected light passes through light ports 20. The photocell signals coincide with either a positive or negative signal from the micrometer transducer 6 once each revolution of the wheel 1, and the combination of these signals indicates whether the coin is lighter or heavier than the standard.

Figure 5:
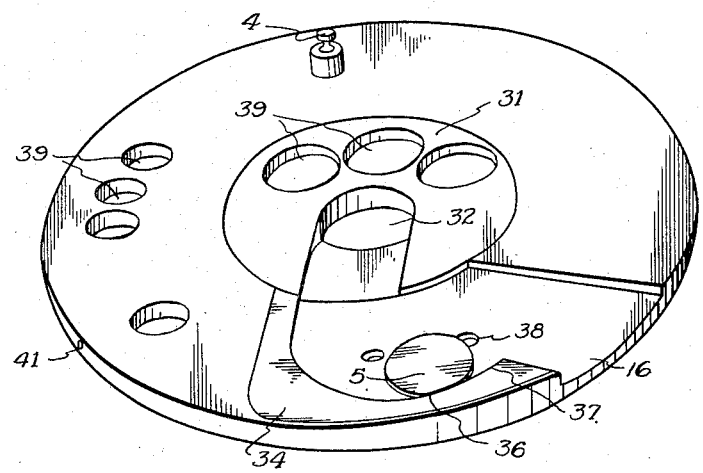
Fig. 5 shows an enlarged view of the bottom half of the coin wheel.

Fig. 5 is an enlarged view of the top of the lower section of coin wheel 1. On one side of the wheel is shown the standard weight 4 while directly opposite the standard in weighing position is the unknown coin 5. The removable center core is shown generally at 31 including a slightly eccentric entrance port 32. A removable clip 34 has a physical detent 36 in which coin 5 is held by centrifugal force. Upon ejection the coin 5 passes over retaining hump 37 and out the exit port 16. Holes 38 are for the purposes of inspection while holes 39 and screws 41 provide means to adjust the balance of the wheel.

The coin 5 is initially inserted into the wheel by a ferrite core solenoid 26 which injects the coin vertically upward into a hole in the bottom of the hub. A 20-$\mu f$. condenser not shown, charged to 800 volts, supplies the energy for the injecting pulse. This pulse, when applied to the solenoid 26, produces a powerful eddy-current magnetic repulsion field between the coin and the core, thereby lifting the coin into the hole. The axis of the hole in the hub is inclined at a small angle to the axis of the rotating spindle and directs the coin into a position that is slightly away from the geometric center of the flywheel. Thereafter, centrifugal force causes the coin to move into the pocket at the periphery of the wheel as shown in the figure. The new coin imparts its kinetic energy to the weighed coin that is already in the pocket, thereby forcing this coin off the wheel. By properly controlling the time at which the new coin is inserted into the wheel, the eject phase position is so chosen that the weighed coin may be cast into an "accept" or "reject" receptacle. The timing is electronically determined by the weight of the coin in the wheel.

The strobe light 32 shown in Fig. 4 is used in conjunction with holes 39 and screws 41 to balance the wheel. If two standard coins are placed in the flywheel, the only source of vibration is the unbalance of the wheel itself. The mutual-inductance micrometer 6 detects this unbalance, and a photocell energized by a light beam reflected from one of the mirrors 17 on the shaft 2 assists in determining the phase of the unbalance. The electronic combination of these two signals operates a stroboscope including strobe light 32 which illuminates only the heavy portion of the wheel. Degree markings on the edge of the wheel identify the heavy position, and adjustments of screws 41 or if necessary drilling holes such as holes 39 permit alteration of the weight distribution. Usually only one or two trials are necessary to restore the wheel to precise balance.

It will be apparent that the embodiments shown are only exemplary and that various modifications can be made in construction and arrangement within the scope of invention as defined in the appended claims.

What is claimed is:

1. A precision weighing device for accurately comparing the weight of an unknown circular object with a standard weight comprising means for rotating said unknown object and said standard weight about a vertical axis perpendicular to the midpoint of a line joining the centers of said object and said standard weight, means for determining the comparative weight of said object by detecting the amplitude of the variation of the center of mass of the combination of said object and said standard weight from said midpoint and means for removing said unknown object from said rotating means without altering the rotational velocity thereof.

2. A precision weighing device for accurately comparing the weight of an unknown circular object with a standard weight comprising means for rotating said unknown object and said standard weight about a vertical axis perpendicular to the midpoint of a line joining the centers of said object and said standard weight, means for determining the comparative weight of said object by detecting the amplitude of the variation of the center of mass of the combination of said object and said standard weight from said midpoint, and means for removing said unknown object from said rotating means and inserting a second circular object to be weighed into said rotating means without altering the rotational velocity thereof.

3. A precision weighing device for accurately comparing the weight of an unknown circular object with a standard weight comprising a rotating shaft, wheel means including means for supporting said object and said standard weight connected to one end of said shaft, means for detecting the displacement amplitude of said shaft caused by a difference in weight between said object and said standard weight and means for simultaneously removing said object from said wheel means and inserting a second circular object to be weighed into said wheel means without altering the rotational velocity thereof.

4. A precision weighing device for accurately comparing the weight of an unknown circular object with a standard weight comprising a vertical rotating shaft, wheel means including means for supporting said object and said standard weight coupled to the lower end of said shaft, means for determining the comparative weight of said object by detecting the amplitude displacement of said shaft, and means for simultaneously removing said object from said wheel means and inserting a second circular object to be weighed into said wheel means without altering the rotational velocity thereof.

5. A precision weighing device for accurately comparing the weight of an unknown coin with respect to a standard weight comprising a double gimbal mounted vertical shaft, means for rotating said shaft at a constant velocity, a wheel connected to the lower end of said shaft, said wheel including means for supporting said coin and a standard weight on opposite sides along a diameter and near the periphery thereof, means for detecting the amplitude of the lateral displacement of said shaft occasioned by a difference in weight between said coin and said standard weight and means for removing said coin from said wheel and inserting a second coin to be weighed without altering the rotational velocity of said wheel.

6. A precision weighing device for accurately comparing the weight of an unknown coin with respect to a standard weight comprising a double gimbal mounted vertical shaft, motor means coupled to the upper end of said shaft for driving said shaft at a constant angular velocity, a weighing wheel connected to the lower end of said shaft, a standard weight supported in said wheel near the periphery thereof, means for retaining an unknown coin near the periphery of said wheel and displaced 180° from said standard weight, means for detecting the relative amplitude of the lateral displacement of said shaft caused by a difference in weight between said coin and said standard weight, means for injecting a second coin to be weighed into the central portion of said wheel, said wheel including means for guiding said injected coin under the influence of centrifugal force into said unknown coin whereby the energy of said injected coin is transmitted to said unknown coin ejecting it from said wheel.

7. A weighing device as defined in claim 6 in which said injecting means includes an electromagnetic solenoid for applying an injecting repulsion force to said second coin.

References Cited in the file of this patent

UNITED STATES PATENTS

| 294,363 | Butler | Mar. 4, 1884 |
| 2,037,443 | Van Degrift | Apr. 14, 1936 |
| 2,629,490 | Bailey | Feb. 24, 1953 |

FOREIGN PATENTS

| 71,073 | Germany | Sept. 22, 1893 |